US006508211B1

(12) United States Patent
Asano (10) Patent No.: US 6,508,211 B1
(45) Date of Patent: Jan. 21, 2003

(54) COOLING SYSTEM FOR LAND VEHICLES (75) Inventor: Kiyomori Asano, Shizuoka (JP)

(73) Assignee: Yamaha Hatsudoki Kabushiki Kaisha (JP)

(*) Notice: Subject to any disclaimer, the term of this patent is extended or adjusted under 35 U.S.C. 154(b) by 0 days.

(21) Appl. No.: 09/718,820

(22) Filed: Nov. 22, 2000

(30) Foreign Application Priority Data

Jun. 29, 1999 (JP) .............................. 11-184468

(51) Int. Cl.[7] .................................................. F01P 7/14
(52) U.S. Cl. ...................................................... 123/41.1
(58) Field of Search .......................... 123/41.31, 41.1, 123/41.44, 41.47, 41.08, 41.33; 236/23, 34, 34.5

(56) References Cited

U.S. PATENT DOCUMENTS

| 5,113,807 A | * | 5/1992 | Kobayashi | ............. | 123/198 C |
| 5,215,044 A | | 6/1993 | Banzhaf et al. | ............. | 123/41.29 |
| 5,857,385 A | | 1/1999 | Takeuchi | | |
| 5,862,662 A | | 1/1999 | Fukuda et al. | | |
| 5,944,133 A | | 8/1999 | Eto | | |
| 5,957,230 A | | 9/1999 | Harano et al. | | |
| 5,992,552 A | | 11/1999 | Eto | | |
| 6,109,219 A | * | 8/2000 | Sano | ............. | 123/41.1 |

* cited by examiner

Primary Examiner—Gene Mancene
Assistant Examiner—Hyder Ali
(74) Attorney, Agent, or Firm—Knobbe, Martens, Olson & Bear, LLP (57) ABSTRACT A land vehicle comprises an engine having a closed loop cooling system. The cooling system includes a heat exchanger and a switching valve arrangement. The valve arrangement allows coolant to bypass the heat exchanger until the coolant temperature has exceeded a preset temperature.

17 Claims, 9 Drawing Sheets

COOLING SYSTEM FOR LAND VEHICLES

RELATED APPLICATIONS

This application is based upon Japanese Patent Application No. HEI 11-184,468, filed Jun. 29, 1999, which is hereby expressly incorporated by reference in its entirety.

BACKGROUND OF THE INVENTION

1. Field of the Invention

The present invention generally relates to closed loop cooling systems for land vehicles. More specifically, the present invention relates to such cooling systems featuring bypass arrangements to better moderate coolant temperature in low temperature operating environments.

2. Description of Related Art

Snowmobiles are popular land vehicles that are used primarily in the winter and in cold and snowy conditions. Snowmobiles are powered by internal combustion engines. To improve emissions, four cycle engines have been replacing two cycle engines in many snowmobiles. Such engines often feature a water cooling system. Such a cooling system circulates coolant or water through various cooling jackets designed to cool specific components of the engine. Often the coolant is circulated using a water pump that is constantly driven by the crankshaft or another shaft that is ultimately powered by the crankshaft.

Because the water pump is constantly driven, coolant begins circulating once the engine is turned over and remains circulating until the crankshaft stops turning. This is particularly disadvantageous in cold weather environments. For instance, lubricant viscosity changes as a function of lubricant temperature. Until an engine has properly warmed-up, the lubricant may not flow properly to various components. Additionally, decreased temperatures can affect pressures and combustion. Accordingly, circulating coolant prior to a preset warm-up temperature can be disadvantageous.

SUMMARY OF THE INVENTION

Accordingly, a cooling system is desired in which coolant can circulate once the engine has started but the coolant circuit can bypass a heat exchanger. Such an arrangement allows the engine to warm-up more rapidly and allows the coolant to bypass the heat exchanger until a present coolant temperature has been reached. Such an arrangement also can be used to help moderate coolant temperature in lower temperature environments.

One aspect of the present invention involves a land vehicle comprising an engine with a cooling jacket disposed within a portion of the engine and communicating with a heat exchanger. The heat exchanger is positioned in a location exposed to ambient air. The engine comprises a crankshaft and a peripheral engine component. The peripheral engine component comprises a cooling jacket. A water pump is drivingly connected to the crankshaft. A closed loop cooling system comprises a first water delivery conduit providing coolant to a switching valve arrangement, a second water delivery conduit providing coolant to the cooling jacket of the peripheral engine component and a water return line returning coolant to the water pump. The switching valve arrangement comprises a valve, a supply line extending to the heat exchanger and a bypass line. The valve is adapted to direct coolant through the heat exchanger if a sensed coolant temperature is above a preset temperature and to direct coolant through the bypass line if the sensed coolant temperature is below the preset temperature.

Another aspect of the present invention involves a snowmobile comprising a frame with at least one steerable ski supporting the frame. An engine is mounted to the frame and a heat exchanger is mounted to the frame. The engine comprises a crankshaft that is rotatably driven and a water pump that is driven by the crankshaft. The engine power a drive belt. A first cooling jacket is disposed within a portion of the engine. A peripheral component is mounted to the engine with a second cooling jacket extending through a portion of the peripheral component. A closed loop cooling system comprises the heat exchanger, the first cooling jacket, the second cooling jacket, the water pump and a switching valve arrangement. The switching valve arrangement is interposed between the water pump and the heat exchanger. The switching valve arrangement comprises a chamber, a supply line extending to the heat exchanger, a return line extending from the heat exchanger to the chamber and a bypass line extending into the chamber without extending through the heat exchanger. A valving assembly is disposed within the chamber and has a first position to direct a substantial flow through the heat exchange and a second position to direct a substantial flow around the heat exchanger. An actuator is adapted to move the valving assembly to the first position if a sensed coolant temperature is above a preset temperature and is adapted to move the valving assembly to the second position if a sensed coolant temperature is below a preset temperature.

A further aspect of the present invention involves a land vehicle comprising an engine with a first cooling jacket disposed within a portion of the engine and communicating with a heat exchanger. The heat exchanger is positioned in a location exposed to ambient air. The engine comprises a crankshaft and a peripheral engine component. The peripheral engine component comprises a second cooling jacket. A water pump is drivingly connected to the crankshaft. A closed loop cooling system communicates with the water pump, the first cooling jacket, the second cooling jacket and the heat exchanger. The cooling system comprises means for bypassing the heat exchanger if a sensed coolant temperature is below a preset temperature.

Further aspects, features and advantages of this invention will become apparent from the detailed description of the preferred embodiment which follows.

BRIEF DESCRIPTION OF THE DRAWINGS

These and other features, aspects and advantages of the present invention will now be described with reference to the drawings of a preferred embodiment, which is intended to illustrate and not to limit the invention. The drawings comprise seven figures.

FIGS. 8 and 9 are schematic illustrations of a cooling system arranged and configured in accordance with certain features, aspects and advantages of the present invention. FIG. 8 shows a temperature controlled valve in a first position while FIG. 9 shows the valve in a second position.

DETAILED DESCRIPTION OF THE PREFERRED EMBODIMENT OF THE INVENTION

Figure 1:
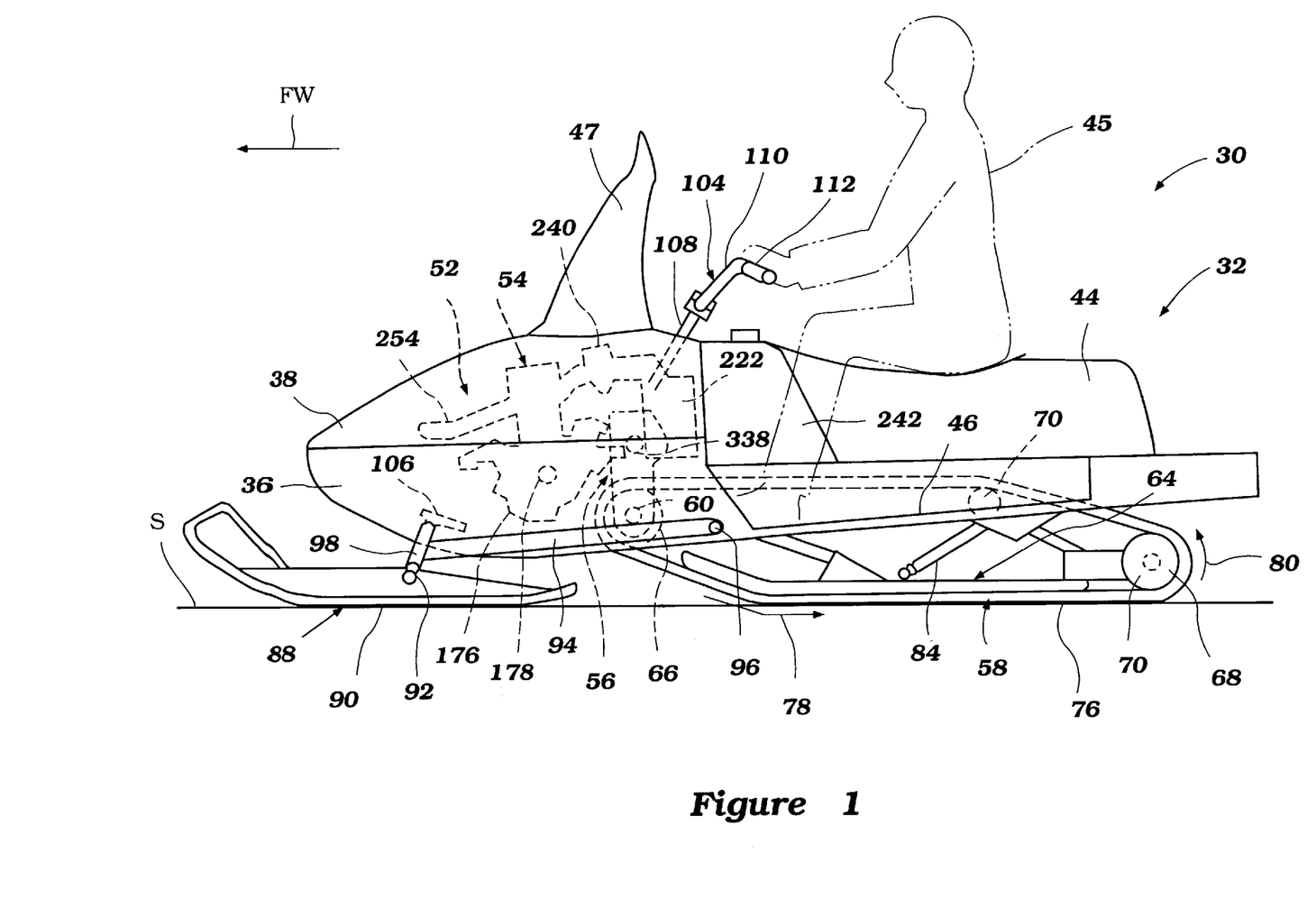
FIG. 1 is a simplified side elevation view of a snowmobile configured and arranged in accordance with certain features, aspects and advantages of the present invention. Certain internal components have been illustrated with hidden lines.
Figure 2:
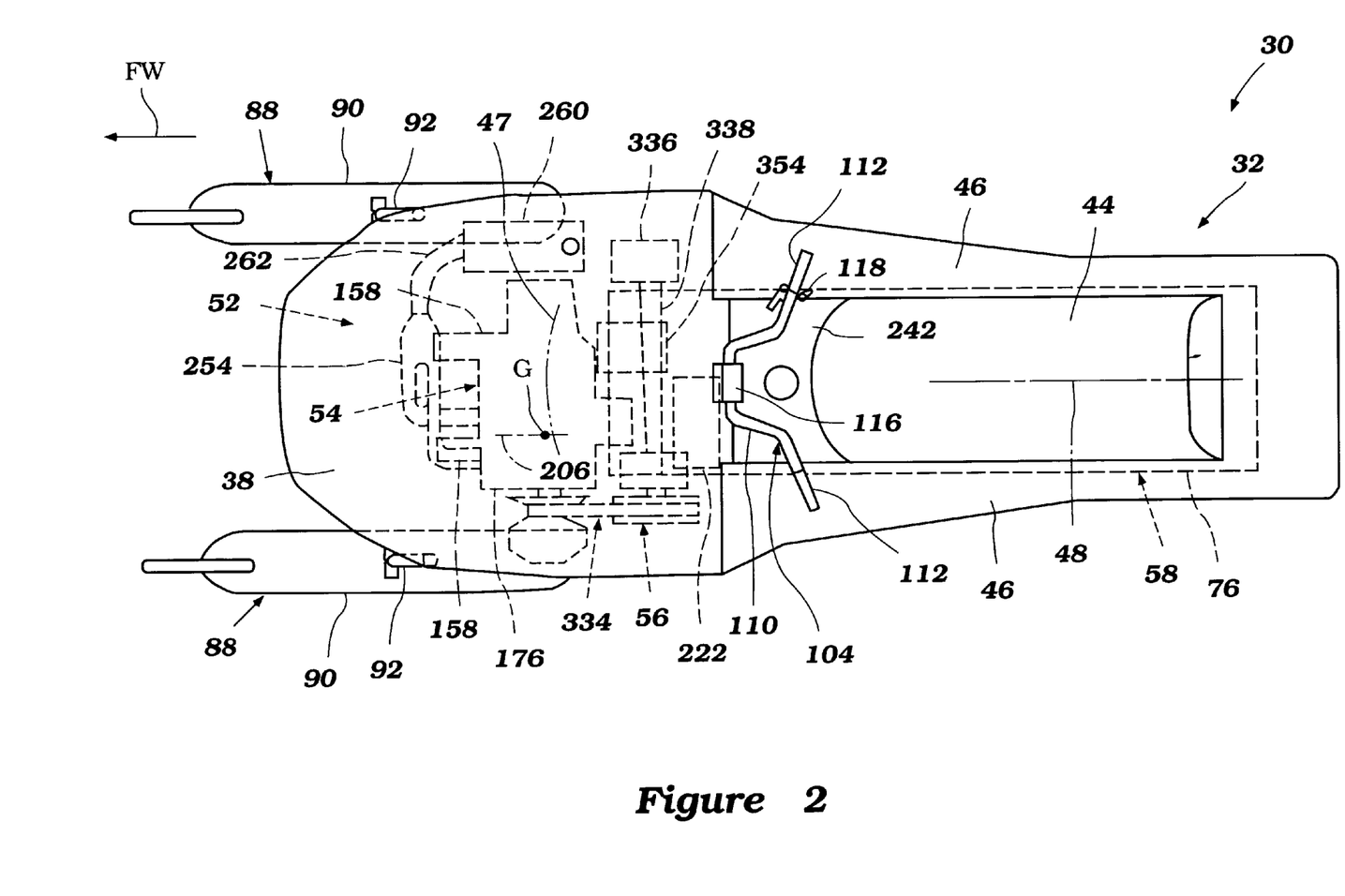
FIG. 2 is a top plan view of the snowmobile of FIG. 1.
Figure 3:
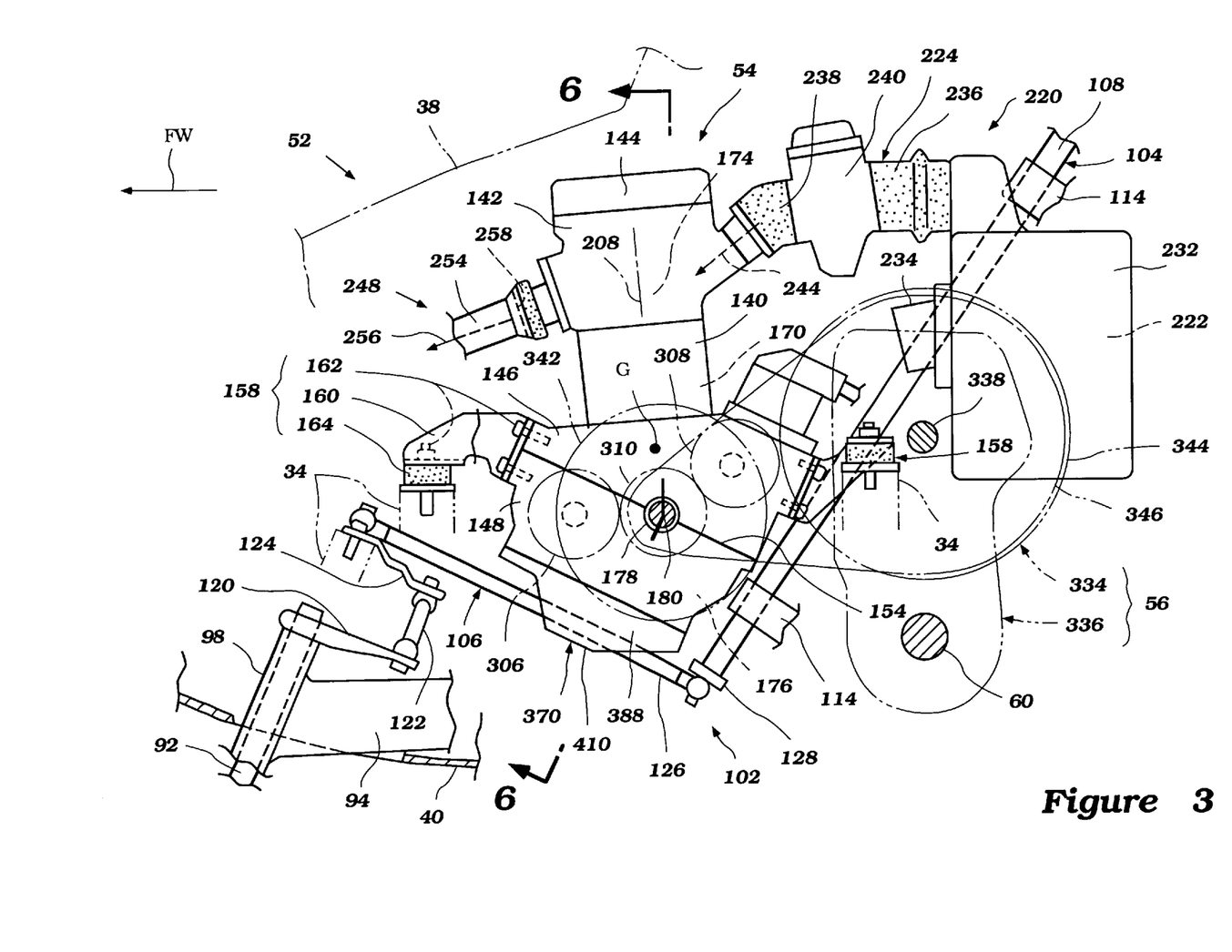
FIG. 3 is an enlarged side elevation view, primarily showing an engine and a steering linkage.

With reference initially to FIGS. 1–3, an overall construction of a land vehicle is illustrated therein. In the illustrated arrangement, the land vehicle comprises a snowmobile 30 configured and arranged in accordance with certain features, aspects and advantages of the present invention. The snowmobile 30 is an exemplary land vehicle. Although the present invention will be shown and described in the context of the illustrated snowmobile, some aspects and features of the present invention also can be employed with other land vehicles in manners that will become apparent.

In general, the snowmobile 30 operates over a snowfield or terrain, indicated generally with the reference letter S in FIG. 1, which typically is covered with snow. The reference mark FW in the figures indicates a forward direction in which the snowmobile 30 generally moves. As used through this description, the terms "right" and "left" will mean at or to the respective sides in a top plan view relative to the forward direction FW.

The illustrated snowmobile 30 generally comprises a frame assembly 32, which can include a plurality of frame members 34 (see FIG. 3). The frame members 34 can be formed with sheet metal, metal pipes or the like and preferably are assembled in any suitable manner to have sufficient rigidity. Two side panels 36 generally cover the sides of the frame assembly 32 in the illustrated arrangement. In addition, a cowling member or hood 38 covers a forward portion of the frame assembly 32. Preferably, the cowling member 38 is detachably coupled with the frame assembly 32 or pivotally hinged thereto at one end so as to pivot about the hinged portion. The side panels 36 and the cowling member 38 can be made of plastic or synthetic resin. A bottom plate 40 (see FIG. 3), which can be made of sheet metal, advantageously covers a bottom portion of the frame assembly 32. Thus, a substantially closed compartment is formed over a forward portion of the frame assembly 32 by the side panels 36, the cowling member 38 and the bottom plate 40.

A seat 44 can be disposed above a rear portion of the frame assembly 32 so that the rider 45. In some arrangements, the seat 44 can be positioned such that a rider 45 can place her feet in front of the seat 44. In the illustrated arrangement, the seat 44 is disposed such that the rider 45 straddles the seat with a foot positioned on each side of the seat 44. Thus, in the illustrated arrangement, a pair of foot rests 46 are disposed on both sides of the seat 44. A windshield 47 extends upwardly from the cowling member 38 to protect the rider 45 from wind and/or snow impinging upon him or her.

With reference to FIG. 2, the frame assembly 32, when provided with the side panels 36, the cowling member 38, the seat 44 and the wind shield 46, generally is substantially symmetrically formed relative to an imaginary center plane 48 extending generally vertically and fore to aft through the frame assembly 32. Due to the arrangement of the various body components, such as the seat 44, the cowling 38, and the side panels 36, for instance, the frame assembly 32 is substantially enclosed.

The side panels 36 and the bottom plate 40 placed in front of the seat 44 together with the cowling member 38 define a generally closed cavity, as discussed above. A prime mover assembly 52 can be enclosed within the cavity. Because the cowling member 38 is detachably coupled with or pivotally hinged to the frame assembly 32, the rider 45, a mechanic or a repairman can access the prime mover assembly 52 for maintenance or the like. The illustrated prime mover assembly 52 generally comprises an internal combustion engine 54 and a transmission 56 which transmits power from the engine 54 to a drive assembly or unit 58 through a driveshaft 60. In other words, the transmission converts the engine output to speed and torque. In the illustrated arrangement, the driveshaft 60 is journaled on the frame assembly 32.

With reference again to FIG. 1, the drive assembly 58 depends from the frame assembly 32 and is generally disposed beneath the seat 44. The drive assembly 58, although somewhat schematically shown in FIG. 1, preferably includes a slide rail unit 64, a drive sprocket 66, a set of idle shafts 68 and a corresponding set of idle sprockets 70. The slide rail unit 64 comprises a pair of slide rails which extend fore and aft along the center plane 48. Preferably, the slide rails are spaced apart from one another. The respective idle shafts 68 extend generally transversely and are journaled on the illustrated slide rail unit 64. The idle sprockets 70 preferably are suitably secured to the respective idle shafts 68.

The slide rail unit 64 together with the drive sprocket 66 and the idle sprockets 70 support an endless drive belt 76. More specifically, the slide rail unit 64 abuts a backside of the drive belt 76, which is opposite the side of the drive belt 76 facing the terrain S, and the drive sprocket 66 engages with the drive belt 76 to provide rotational movement to the drive belt 76. The respective idle sprockets 70 contact the drive belt 76 in known manners. With reference to FIG. 2, the drive belt 76 has a relatively broad width and a longitudinal center line of the drive belt 76 is placed generally on the center plane 48. When the drive sprocket 66 rotates, the drive belt 76 also rotates in a direction indicated with the arrows 78, 80. Because the drive belt 76 has a sufficient contact area with the terrain S, the drive belt 76 produces a friction or traction force and the rotation of the drive belt 76 propels the snowmobile along the terrain S.

The drive assembly 58 preferably is provided with at least one suspension unit 84. The suspension units 84 suspend the slide rail units 64 and damp movement of the suspension unit 84 relative to the frame assembly 32. The damping movement of the suspension units 84 properly absorbs shocks coming from rough surfaces of the terrain S and hence the rider 45 can enjoy a comfortable ride.

In the illustrated arrangement, the snowmobile 30 also includes a pair of steering skis 88. Each ski 88 preferably comprises a ski member 90 and a knuckle pin 92. The ski member 90 includes a contact area, which typically abuts on the terrain S during movement of the snowmobile 30. The knuckle pin 92 is coupled with the ski member 90 at a generally top center portion of the ski member 90 and allows the ski to pivot fore and aft such that the ski member 90 can follow rough surfaces of the terrain S.

With reference to FIG. 1, a pair of support members 94 supports the respective steering skis 88 at both sides of the frame assembly 32. Each support member 94 preferably has one end 96 secured to the frame assembly 32. A sleeve 98 is formed at the other end of the support member 94. The sleeve 98 extends generally vertically and inclines slightly rearward. Preferably, the sleeve 98 is welded at a mid portion thereof to the support member 94. The sleeve 98 pivotally supports the rod member 94 about a steering axis that extends generally vertically. Through this mounting arrangement, the ski members 90 can be steered, i.e., their forward portions are selectively directed in the right or left direction.

In order to steer the skies 88, the snowmobile 30 includes a steering linkage 102 that is arranged and configured in accordance with certain features, aspects and advantages of the present invention. With reference now to FIGS. 2–5, the steering linkage 102 comprises a steering handle assembly 104 and a linkage assembly 106.

The illustrated steering handle assembly 104 comprises a handle post 108, a handle bar 110 and a pair of grips 112. The handle post 108 extends generally vertically but its top portion inclines slightly rearward. The frame assembly 32 supports the handle post 108 with support members 114 (see FIG. 3) in a manner that provides for pivotal movement of the handle post 108 about a steering axis. The handle bar 110 is positioned atop the handle post 108 and is coupled thereto by a coupling member 116 or in any other suitable manner. The grips 112 can be secured to both ends of the handle bar 110. Preferably, a throttle lever 118 is provided on the right hand side of the handle bar 110. In the illustrated arrangement, the handle post 108 defines a first linkage member in the linkage assembly 106.

The linkage assembly 106 couples the steering handle assembly 104 with the steering skies 88 such that the pivotal movement of the steering handle assembly 102 about the steering axis moves the steering skies 88 in the right or left direction. The linkage assembly 106 in the illustrated arrangement includes two knuckle arms 120 (see FIG. 3), two tie rods 122 (see FIG. 4), a center arm 124, a relay rod 126 and a pitman arm 128. Of course, other components also can be incorporated and some components can be integrated into a single component.

In the illustrated arrangement, the knuckle arms 120 are mounted to the respective knuckle pins 92. The tie rods 122 then couple the knuckle arms 120 with the center arm 124 which can pivot about a pivot axis 130 extending generally vertically as indicated by the arrows 132 of FIG. 4. Of course, as shown in FIG. 3, generally vertically should be construed to encompass a slight incline to accommodate the angles formed by the rotational axes running through the various components.

The forward end of the relay rod 126 in the illustrated arrangement is pivotally connected to a portion of the center arm 124. The connection between the relay rod 126 and the center arm 124 preferably is off set from the pivot axis 130 so that the center arm 124 pivots about the pivot axis 130 when the relay rod 126 is pushed or pulled. The other end, i.e., the rear end, of the relay rod 126 is pivotally connected to one end of the pitman arm 128. The pitman arm 128 preferably is affixed to a lower portion of the handle post 106. In the illustrated arrangement, the relay rod 126 inclines such that the forward end of the relay rod 126 is positioned higher than the rear end. Such a configuration advantageously increases the area for the forward linkage to be positioned for operation by increasing the ground clearance at that location. In other words, the simpler connection is mounted lower than the more complicated connection (i.e., that having more moving components). In the illustrated arrangement, the relay rod 126 defines a second linkage member.

Because of this arrangement, when the rider 45 turns the handle post 108 with the handle bar 110, the pitman arm 128 pivots about an axis of the handle post 108. With this movement of the pitman arm 128, the relay rod 126 is pushed or pulled in an axial direction as indicated by the arrows 134 of FIG. 4. The center arm 124 thus pivots about the pivot axis 130 and moves the respective tie rods 122 right or left as indicated by the arrows 136. Both of the tie rods 122 then move in the corresponding right or left direction. For example, if the tie rod 122 on the right hand moves in the right direction, the other tie rod 122 moves also in the right direction, and vice versa. The knuckle arms 120 then pivot the respective knuckle pins 92. Accordingly, the respective steering skies 88 pivot in the right direction or left direction in compliance with the pivotal direction of the center arm 124 With reference now to FIGS. 3–7, the prime mover assembly 52 is disposed within the substantially closed protective cavity defined by the side panels 36, the bottom plate 40 and the cowling member 38. The engine 54 is placed generally forward of the transmission 56 within this cavity.

In the illustrated arrangement, the engine 54 operates on a four-cycle principle and includes an cylinder block 140, a cylinder head member 142, a cylinder head cover member 144, an upper crankcase member 146 and a lower crankcase member 148. It is anticipated that some features, aspects and advantages of the present could be used with a two-stroke or rotary engine.

In the illustrated arrangement, the upper crankcase member 146 is placed under the cylinder block 140 and the lower crankcase member 148 is placed under the upper crankcase member 146. Both the crankcase members 146, 148 are joined together at a coupling line 154 which is generally defined by a lower surface of the upper crankcase member 146 and an upper surface of the lower crankcase member 148. In the illustrated arrangement, the coupling line 154 is inclined downward and rearward. In addition, the coupling line generally extends through at least a portion of the crankshaft and, more preferably, is aligned with a rotational axis of the crankshaft.

Figure 4:
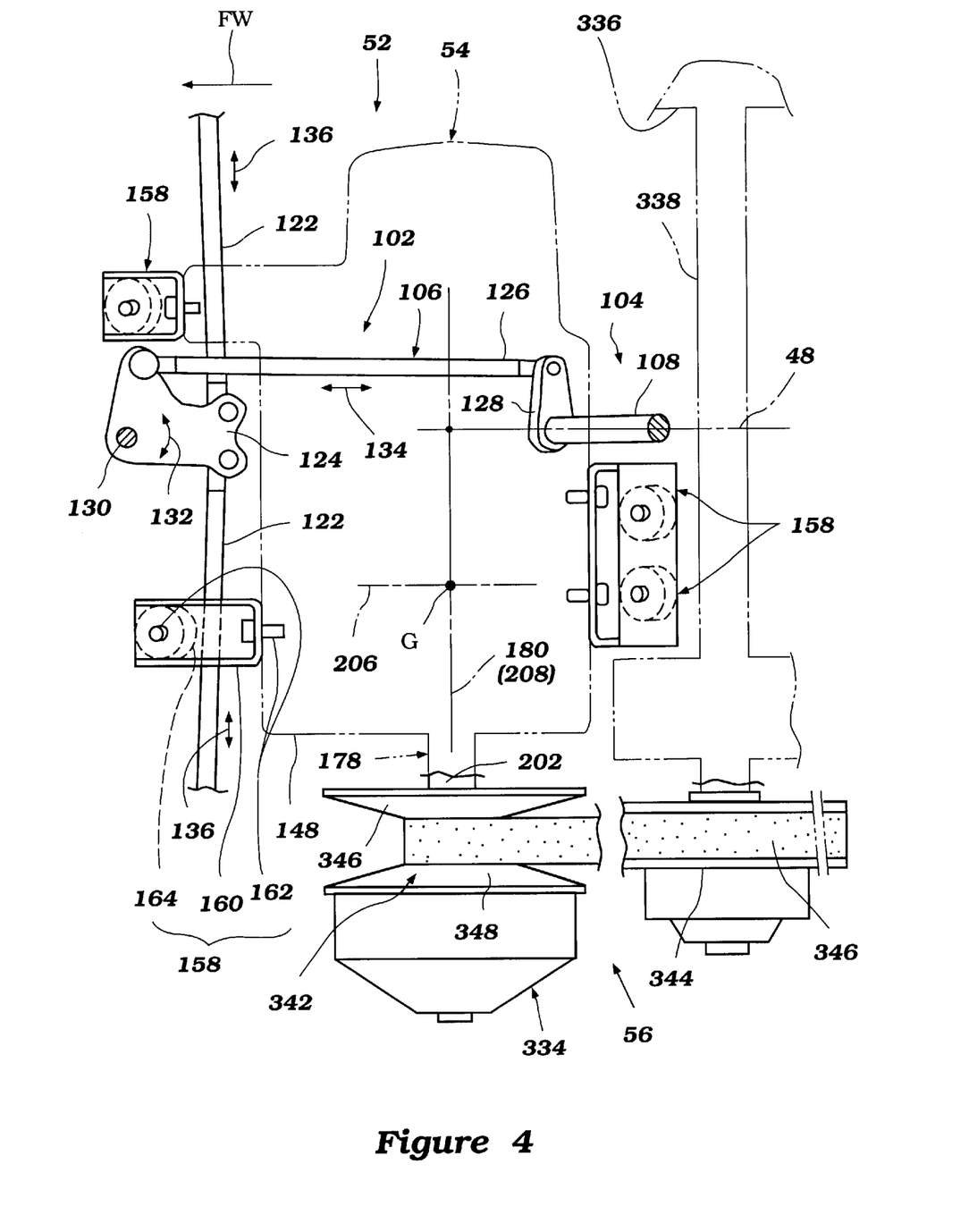
FIG. 4 is an enlarged top plan view, primarily showing the engine and the steering linkage.

With reference now to FIGS. 3 and 4, the upper crankcase member 146 is mounted to the frame members 34 alone or in combination with the lower crankcase member 148 by a plurality of mount assemblies 158. The illustrated mounting arrangement allows the engine 54 to be securely mounted to the frame assembly 32. Each mount assembly 158 preferably includes a bracket or stay 160, bolts 162 and an elastic member 164. The brackets 160 can be attached to the crankcase members 146, 148 directly by the bolts 162 and are can be affixed to the frame assembly 32 indirectly via the elastic members 164 by the bolts 162. The elastic members 164 preferably are made of a rubber material to isolate vibration energy from the frame. Advantageously, because the engine 54 is mounted on the frame assembly 32 in this manner, most of the low grade vibrations produced by the engine 54 are not transferred to the frame assembly 32. Although not shown, the transmission 56 preferably is coupled with the engine 54 and also can be mounted to the frame assembly 32 directly or indirectly via the engine 54. In other words, in some arrangements, the transmission 56 and the engine 54 are mounted to the frame assembly 32 as a single unit.

Figure 6:
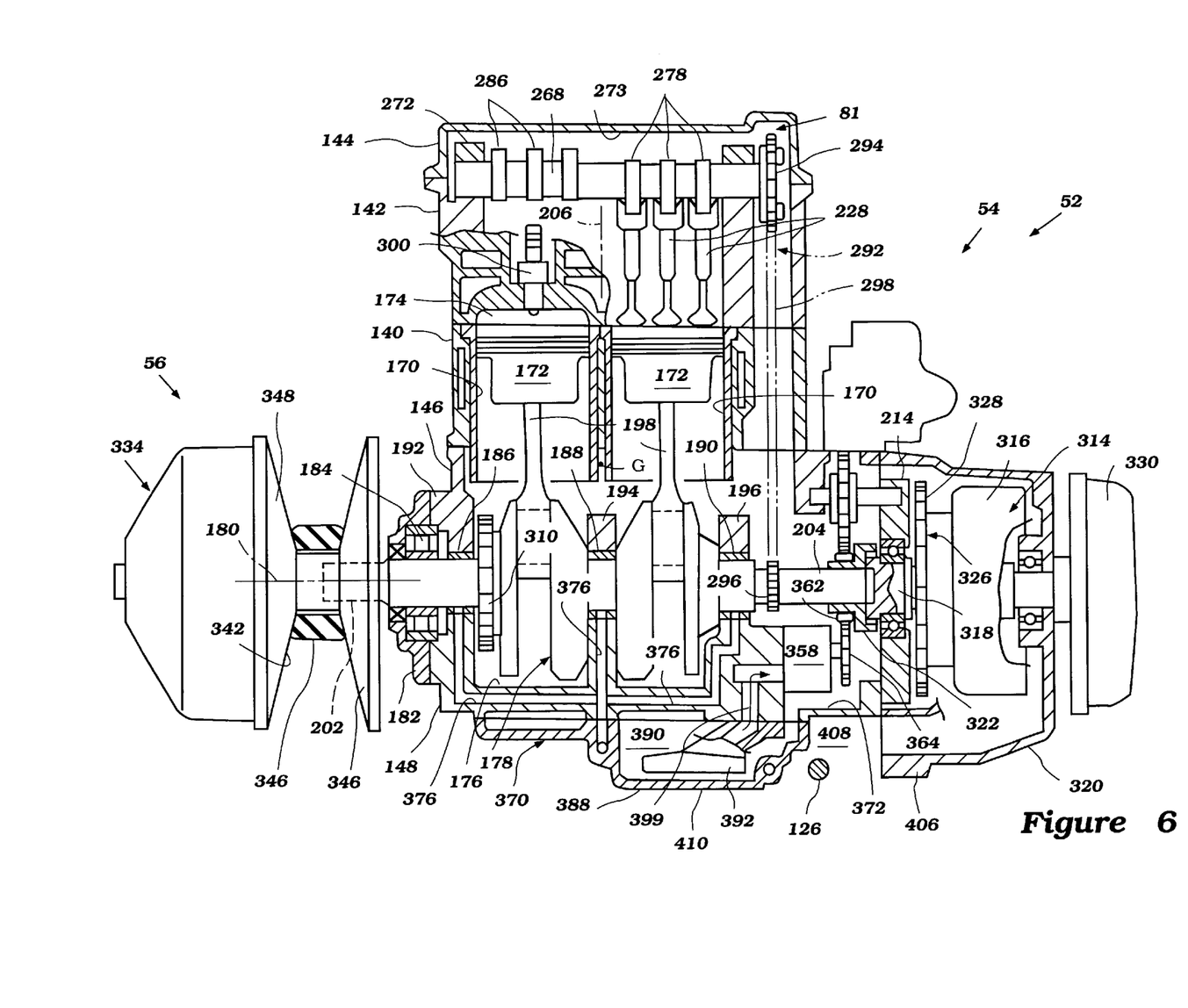
FIG. 6 is a cross-sectional view taken along the line 6—6 of FIG. 3.

With reference now to FIG. 6, the illustrated cylinder block 140 defines two cylinder bores 170. The cylinder bores 170 extend generally vertically and are horizontally spaced from each other so as to stand side by side. This type of engine, however, is only exemplary. Engines having other number of cylinder bores, having other cylinder arrangements and operating on other combustion principles (e.g., two-stroke crankcase combustion or rotary) all can be used with certain features, aspects and advantages of the present invention.

A piston 172 can reciprocate in each cylinder bore 170. The cylinder head member 142 is affixed to the top end of the cylinder block 140 and, together with the pistons 172 and the cylinder bores 170, defines two combustion chambers 174.

The upper and lower crankcase members 146, 148 preferably close the lower end of the cylinder block 140. The crankcase members 146, 148 together define a crankcase chamber 176. A crankshaft 178 extends generally horizontally within the crankcase chamber 176 so that an axis 180 of the crankshaft 178 extends generally normal to the center plane 48. In other words, the engine preferably is transversely mounted. The coupling line 154 crosses the axis 180 (see FIG. 5). A crankcase cover member 182 preferably covers a left end of the coupled upper and lower crankcase members 146, 148 and substantially encases a set of bearings 184 and a seal.

The crankshaft 178 is journaled by the crankcase members 146, 148 and the cover member 182. In the illustrated arrangement, a plurality of bearings 184, 186, 188, 190, which are positioned at the cover member 182 and a left side portion 192, a middle portion 194 and a right side portion 196 of the crankcase members 146, 148, respectively, support the crankshaft 178. The crankshaft 178 is connected to the pistons 172 by connecting rods 198 and is rotated by the reciprocal movement of the pistons 172. In the illustrated arrangement, the crankshaft 178 is configured so that both the pistons 172 move 360 degrees out of phase relative to one another. That is, for example, when one of the pistons 172 is in the power stroke, the other piston 172 is in the intake stroke.

A left side end 202 of the crankshaft 178 extends beyond the cover member 182, while the right side end 204 of the crankshaft 178 extends beyond the right side portion 196. In the illustrated embodiment, an imaginary vertical plane 206 extends through a center of the middle portion 194 generally parallel to the center plane 48. Another imaginary vertical plane 208 which includes the crankshaft axis 180 crosses the vertical plane 206. The center of gravity G of the engine 54 preferably exists generally in the line where both the vertical planes 206, 208 cross each other and in generally a top area of the crankcase chamber 176, as shown in FIGS. 3–6.

With reference to FIG. 6, in the illustrated arrangement, although the left side portion 192 actually defines an end wall of the crankcase chamber 176, the right side portion 194 does not define the other wall end of the crankcase chamber 176 and the chamber 196 expands further beyond the right side portion 194. A bearing member 214, which will be described shortly, substantially defines the right side end wall of the crankcase chamber 176. A portion of the crankshaft 178 between the middle portion 194 and the right side portion 196 is positioned almost at the center of the crankcase chamber 176 along the crankshaft axis 180.

Figure 7:
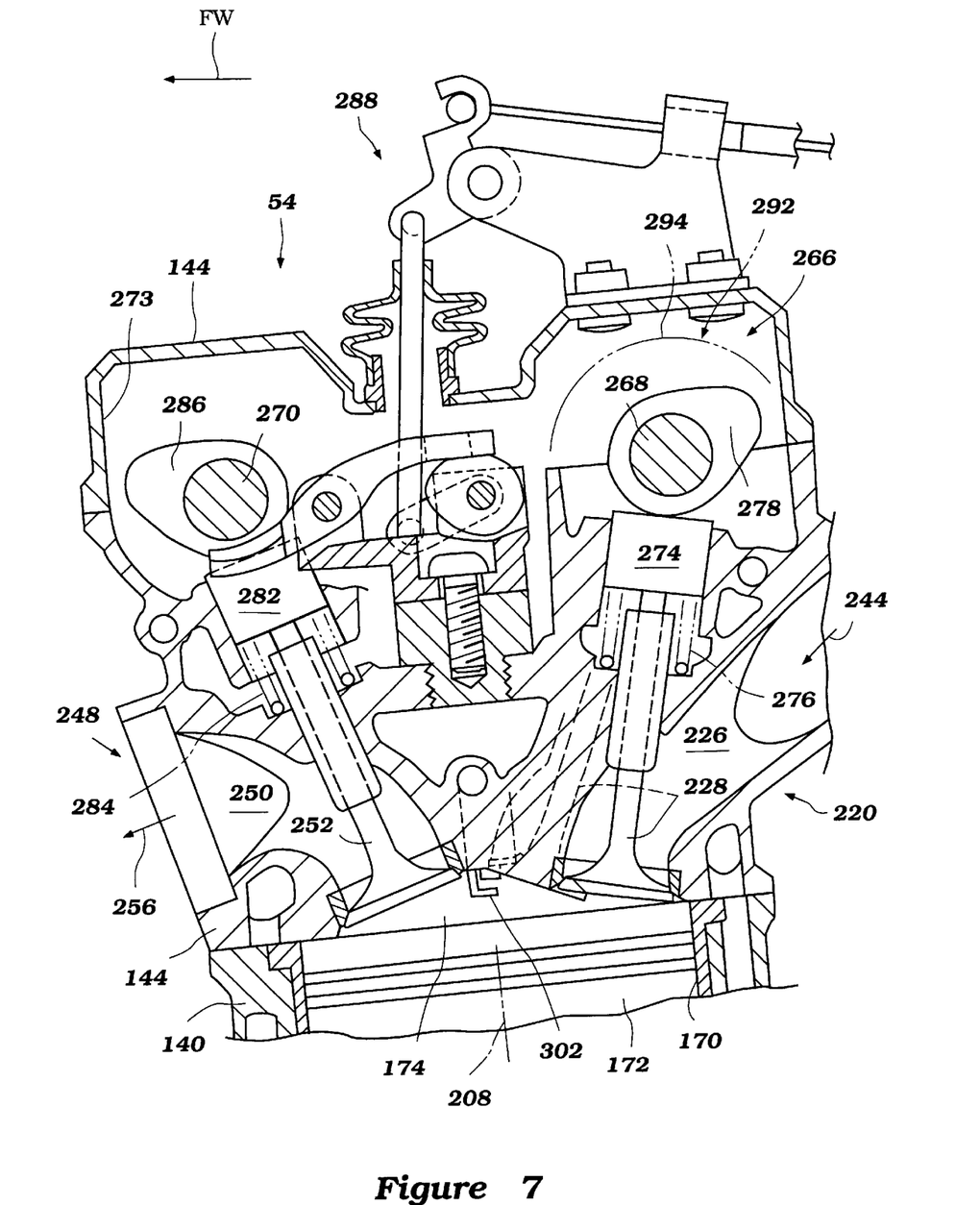
FIG. 7 is a cross-sectional view showing a combustion chamber, intake and exhaust ports, intake and exhaust valves and a valve drive mechanism of the engine.

With reference again to FIG. 3, the engine 54 includes an air induction system 220 through which air is introduced into the combustion chambers 174. The induction system 220 preferably includes a plenum chamber 222, two air intake passages 224 and six intake ports 226 (FIG. 7). As will be recognized, the number of intake passages and ports can vary.

The intake ports 226 are defined in the cylinder head member 144. In the illustrated arrangement, three of the intake ports 226 are associated with a single intake passage 224 and these intake ports 226 open into a single combustion chamber 174. The intake ports 226 are repeatedly opened and closed by intake valves 228. When the intake ports 226 are opened, the respective intake passages 224 communicate with the associated combustion chambers 174.

The plenum chamber 222 generally functions as an intake silencer and/or a coordinator of air charges. The plenum chamber 222 preferably also functions as an air cleaner and contains a cleaner element that removes foreign substances (i.e., dirt and dust) from the air. In the illustrated arrangement, a plenum chamber member 232 defines the plenum chamber 222 and is mounted to the frame assembly 32 in a conventional manner. The plenum chamber member 232 preferably has an air inlet opening 234 that opens forwardly in the closed cavity. The illustrated intake passages 224 extend forwardly from the plenum chamber member 232. Each intake passage 224 is defined by an upstream intake duct 236, a downstream intake duct 238 and a carburetor 240 interposed between both the intake ducts 236, 238. The respective ducts 236, 238 preferably are made of elastic material such as rubber.

The carburetor 240 includes a throttle valve and a fuel measurement mechanism that measures an amount of fuel supplied to the associated combustion chamber 174 in proportion to an amount of air measured by the throttle valve. The throttle valve is coupled with the throttle lever 118 on the handle bar 110 by an appropriate control cable so that the rider 45 can operate it. The fuel is introduced into the carburetor 240 from a fuel supply tank 242 (FIG. 1), which preferably is disposed between the cowling member 38 and the seat 44, through a proper fuel supply conduit.

The air in the cavity is introduced into the plenum chamber 222 through the air inlet opening 234 and then is introduced into the combustion chambers 174 through the respective intake passages 224 and the intake ports 226, as indicated by the arrow 244 of FIGS. 3 and 7. On the way to the combustion chambers 174, the fuel is mixed with the air in the carburetors 240 to form air/fuel charges that can be burned in the combustion chambers 174. The engine 30, of course, can include a fuel injection system (either direct or indirect) instead of, or in addition to, the carburetors 240, which are shown as one type of charge formers that can be employed.

The engine 54 also includes an exhaust system 248 that discharges burnt air/fuel charges or exhaust gases from the combustion chambers 174. Two exhaust ports 250 are defined in the illustrated cylinder head member 144 for each combustion chamber 174 and are repeatedly opened and closed by a corresponding set of exhaust valves 252. When the exhaust ports 250 are opened, the combustion chambers 174 communicate with an exhaust manifold 254 (FIGS. 2 and 3) which collects the exhaust gases and directs them away from the combustion chambers 174, as indicated by the arrow 256 of FIG. 3 and 7. Preferably, the exhaust manifold 254 is connected to the exhaust ports 250 by intermediate tubular members 258 made of an elastic material, such as rubber. The exhaust manifold 254 is coupled with an exhaust silencer 260 through an exhaust conduit 262. The exhaust gases move to the silencer 260 from the exhaust manifold 254. The silencer 260 reduces exhaust noise to a level below than a predetermined level and then discharges the exhaust gases to the atmosphere, i.e., out of the cavity, through an appropriate exhaust pipe. The exhaust system can be tuned in any suitable manner.

The engine 54 preferably has a valve drive mechanism 266 that comprises an intake camshaft 268 and an exhaust camshaft 270. The camshafts 268, 270 extend generally parallel to one another and are journaled on the cylinder head member 144, which has an appropriate bearing construction. Camshaft caps 272 (see FIG. 6), which also have a suitable bearing construction, fix the camshaft 268, 270 onto the cylinder head member 144. The cylinder head cover member 144 defines a camshaft chamber 273 together with the cylinder head member 144.

Each illustrated intake valve 228 comprises an intake valve tappet 274. A bias spring 276 preferably urges each tappet 274 in a direction that closes the valve 228. The intake camshaft 268 has cam lobes 278 that can push the respective intake valve tappets 274 downwardly with the rotation of the intake camshaft 268 against the urging force of the bias springs 276. The intake camshaft 268 thus actuates the intake valves 228 with the cam lobes 278 that push the tappets 274. Accordingly, the associated intake ports 226 are opened and closed repeatedly by rotation of the camshaft 268.

Like the intake valves 228, each illustrated exhaust valve 252 comprises an exhaust valve tappet 282. A bias spring 284 urges each tappet 282 such that the valve 252 is closed. The exhaust camshaft 270 also has cam lobes 286 that can push the respective exhaust valve tappets 282 downwardly against the urging force of the bias springs 284 with the rotation of the exhaust camshaft 270. The exhaust camshaft 270 thus actuates the exhaust valves 252 with the rotation of the camshaft 270. Accordingly, the associated exhaust ports 250 are opened and closed repeatedly by rotation of the camshaft 270.

In the illustrated arrangement, the valve drive mechanism 266 further includes a decompression mechanism 288. This mechanism 288 advantageously assists manual starting of the engine 54 (i.e., use of a recoil starter) by holding the exhaust valves 252 in the open position before the engine 54 starts. By holding the exhaust valves in an open position, the compression within the cylinder can be greatly reduced during the compression stroke of the piston. After the engine 54 starts, the mechanism 288 immediately releases the valves 252 for normal operation.

With reference again to FIG. 6, the crankshaft 178 drives the camshafts 268, 270 through a suitable cam drive mechanism 292. Each camshaft 268, 270 in the illustrated arrangement has a driven sprocket 294 (FIG. 6) while the crankshaft 178 has a drive sprocket 296. The driven sprockets 294 have a diameter that is twice as a diameter of the drive sprocket 296. A timing chain or belt 298 is wound around the respective sprockets 294, 296. The crankshaft 178 therefore drives the respective camshafts 268, 270. A rotational speed of the camshafts 268, 270 is half of the rotational speed of the crankshaft 178 because of the difference in the diameters of the respective sprockets 294, 296. That is, the engine 54 completes one cycle comprising the intake stroke, compression stroke, power stroke and exhaust stroke during two rotations of the crankshaft 178 and, thus, the valves are opened and closed once during the two cycles of the piston.

The engine 54 further includes an ignition or firing system that ignites the air/fuel charges in the combustion chambers 174 during every power stroke. Each combustion chamber 174 is provided with a spark plug 300 (see FIG. 6) which has an electrode 302 (see FIG. 7) exposed into the associated combustion chamber 174. The ignition system makes a spark at each electrode 302 at an appropriate ignition timing under control of an ignition control device so that the air/fuel charge is properly ignited. The air/fuel charge burns and abruptly expands in a manner that pushes the pistons 172 downward. The movement of the pistons 172 rotates the crankshaft 178. The burnt charges or exhaust gases are then discharged through the exhaust system 248, which has been described above.

With reference again to FIG. 3, the engine 54 preferably has with balancers 306, 308 disposed within the crankcase chamber 176 to balance the synchronous movement of the pistons and to provide smooth rotation of the crankshaft 178. The balancer 306 is journaled by the lower crankcase member 148 and is placed forwardly of the crankshaft 178, while the balancer 308 is journaled by the upper crankcase member 146 and is placed rearwardly of the crankshaft 178. The respective balancers 306, 308 are driven through gear configurations. In the illustrated arrangement, the crankshaft 178 has a gear 310 next to the left side wall 192 of the crankcase members 146, 148. The balancers 306, 308 mesh with the gear 310 so that the crankshaft 178 rotates both the balancers 306, 308. Preferably, the gear ratio is one-to-one to provide synchronous movement of the balancers and the crankshaft.

With reference again to FIG. 6, the engine 54 further comprises a flywheel magneto assembly 314 positioned at a location beyond the bearing member 214. The flywheel magneto assembly 314 preferably is housed in its own chamber and includes a rotor 316 that has a shaft 318 journaled for rotation by the bearing member 214. A housing member 320 is affixed to the crankcase members 146, 148 so as to enclose the flywheel magneto assembly 314 therein. A joint 322 couples the shaft 318 with the right side end 204 of the crankshaft 178 adjacent to the bearing member 214. The crankshaft 178 thus rotates the shaft 318 of the rotor 316 through the joint 322. The rotor 316 is configured in a generally cup-shape and a plurality of permanent magnets is affixed to an inner surface that defines the cup-shape. The flywheel magneto assembly 314 also includes a plurality of stator coils preferably affixed to a support member extending from an inner surface of the housing member 320 toward the rotor 316. The arrangement allows the magnets to intermittently pass the coils. The flywheel magneto assembly 314 thus generates AC power when the magnets in the rotor 316 rotate relative to the stator coils. Preferably, a rectifier-regulator circuit converts the AC power to DC power and a battery accumulates the DC power for usage of electrical devices of the snowmobile 30.

The rotor 316 preferably is made of metal and has sufficient weight to act as a flywheel. Because the rotor shaft 318 is separately formed from the crankshaft 178 and is coupled with the crankshaft 178 by the joint 322, the crankshaft 178 length is advantageously shortened. This is advantageous because production of the crankshafts becomes easier.

The engine 54 also has a starter mechanism 326 that can start the engine 54. The starter mechanism 326 preferably includes a starter gear 328 formed around the rotor shaft 318 and a starter motor which has a motor gear that meshes with the starter gear 328. A main switch activates the starter motor. When the rider 45 turns on the main switch before the engine 54 has started, the starter motor rotates and the rotor shaft 318 is driven by the starter motor through the combination of the motor gear and the starter gear 328. The rotor shaft 318 then rotates the crankshaft 178 through the joint 322 and the engine 54 thus is started.

In the illustrated embodiment, the starter mechanism 326 also includes a manual starter assembly 330 disposed outside of the housing 320 and at the outer end of the rotor shaft 318. The manual starter assembly 330 preferably is a recoil starter and includes a coiled rope with a handle affixed to an outer end of the rope. By pulling the rope with the handle, the crankshaft 178 is rotated and the engine 54 can be started. The foregoing decompression mechanism 288 can assists this manual start. The rider 45 therefore can selectively use the electrical starter assembly, which comprises the starter gear 328 and the starter motor, or the manual starter assembly 330 for starting the engine 54.

As described above, the snowmobile 30 is provided with the transmission 56, which defines the other section of the prime mover assembly 52, to transmit the output of the engine 54 to the drive assembly 58. With reference to FIG. 3, the transmission 56 includes an automatic transmission mechanism 334, a reduction gear combination mechanism 336 and a transmission shaft 338.

With reference to FIGS. 4 and 6, the automatic transmission mechanism 334 preferably is generally disposed along the left side of the snowmobile 30. The automatic transmission mechanism 334 includes a drive pulley 342 affixed to the left side end 202 of the crankshaft 178, a driven pulley 344 affixed to the left side end of the transmission shaft 338 and a transmission belt 346 wound around both the pulleys 342, 344. The transmission belt 346 conveys the output power of the engine 54 to the transmission shaft 338.

The drive pulley 342 includes a fixed member 346 and a moveable member 348, which have conical shapes. The moveable member 348 can move along the axis 180 of the crankshaft 178 and the separation between the fixed member 346 and the moveable member 348 can vary by centrifugal force. The belt 346 thus is positioned in a valley formed between the respective members 346, 348, which have conical shapes. When the engine speed increases, the effective diameter of the drive pulley 342 of the belt 346 increases because the moveable member 348 moves to the right. Of course, the driven pulley size also can be varied.

As seen in FIGS. 2 and 4, the reduction gear combination mechanism 336 is generally disposed on the right hand side of the snowmobile 30. This mechanism 336 includes a gear train that has at least a relatively small diameter gear affixed to the transmission shaft 338 and a relatively large diameter gear affixed to the driveshaft 60. The gears mesh either directly or via other one or more other gears. The driveshaft 60 therefore rotates in a fixed reduced speed relative to the rotation of the transmission shaft 338.

When the engine 54 operates under a normal running condition, the output of the engine 54 is transmitted to the transmission shaft 338 from the crankshaft 178 through the automatic transmission mechanism 334. The transmission shaft 338 rotates at a speed that is defined with the variable reduction ratio relative to the crankshaft 178 by the automatic transmission mechanism 334. The transmission shaft 338 then rotates the driveshaft 60 in a speed that is defined with the fixed reduction ratio relative to the transmission shaft 338 by the reduction gear combination mechanism 336. The driveshaft 60, in turn, drives the endless drive belt 76 through the drive sprocket 96. Accordingly, the drive belt 76 rotates and the snowmobile 30 can move.

With reference to FIGS. 3–6, a lubrication system 352 is provided within the engine 54. The lubrication system 352 is provided for lubricating engine portions such as bearings 186, 188, 190 and pistons 172 that need lubrication for avoid seizure. In the illustrated arrangement, the lubrication system 352 employs a dry-sump configuration. This type of lubrication system 352 primarily includes a lubricant oil reservoir 354, a delivery oil pump 357 and, in some arrangements, an oil return pump 358.

Figure 5:
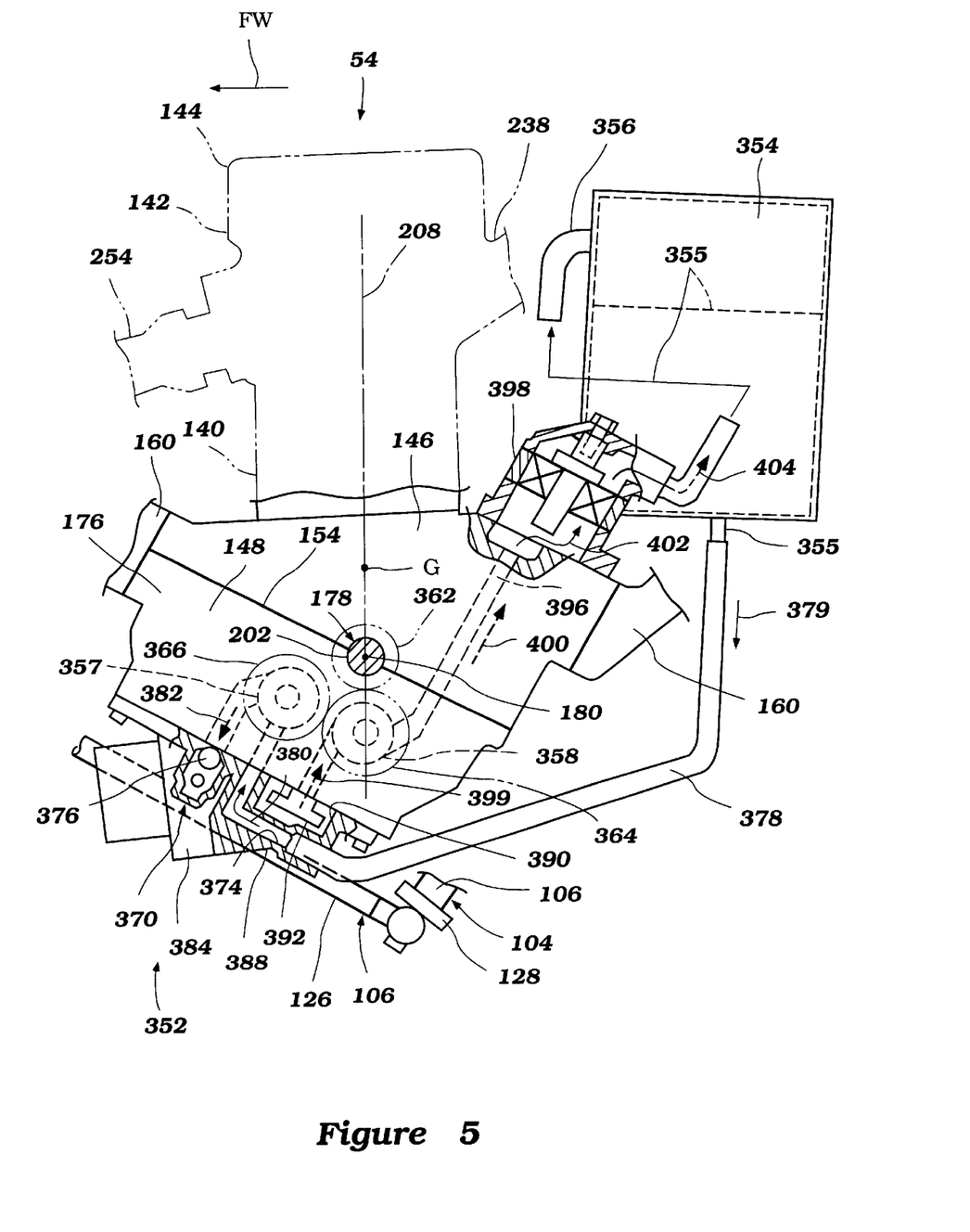
FIG. 5 is another enlarged side elevation view, primarily showing a lubrication system of the engine.

With reference to FIGS. 2 and 5, the oil reservoir 354 can be disposed generally behind the engine 54 and can be mounted on the frame assembly 32. More specifically, in the illustrated arrangement, the oil reservoir 354 is positioned behind the cylinder block 140 and higher than the flywheel magneto assembly 314. The location of the oil reservoir 354 is generally opposite to the drive pulley 342 of the automatic transmission mechanism 334 relative to the vertical plane 206. The illustrated oil reservoir 354 has a supply outlet port 355 at a bottom portion thereof and a return inlet port 356 at a side portion thereof. The oil reservoir 354 preferably contains a preset level of lubricant oil. This level is generally kept substantially constant by oil that returns to the reservoir 354 after lubricating the engine portions. The oil is returned through an oil circulation mechanism that works with the delivery and return pumps 357, 358 in the illustrated arrangement. Of course, the oil can be returned under the forces of gravity in some arrangements.

The delivery pump 357 and the return pump 358 in the illustrated arrangement are generally disposed in a space defined between the right side portion 196 of the crankcase members 146, 148 and the bearing member 214. That is, the pumps 357, 358 are positioned lower than the oil reservoir 354. Any type of pumps, for example, a trotted-type and a displacement-type, can be applied as the oil pumps 357, 358.

With reference to FIG. 5, in the illustrated arrangement, the crankshaft 178, the return pump 358 and the delivery pump 357 have gears 362, 364, 366, respectively. The gear 362 of the crankshaft 178 meshes with the gear 364 of the return pump 358 and this gear 364 meshes with the gear 366 of the delivery pump 357. Such a gear train or gear combination is only exemplary and can be of course changeable to any suitable arrangements. In addition, the pumps can be electrically driven, driven by chain or belt or any other suitable drive mechanism.

Preferably, an oil pan 370 depends from the lower crankcase chamber 148 so that the oil that has lubricated the engine portions temporally accumulates therein. The oil pan 370 communicates with the crankcase chamber 176 through a plurality of oil return passageways 372 (see FIG. 6). The oil pan 370 also comprises an inner oil supply passage 374 (see FIG. 5) and an oil delivery passage 376, at least in part. Both of the passages 374, 376 communicate with the oil delivery pump 357. An external oil supply conduit 378 couples the oil supply outlet port 355 with the inner oil supply passage 374. The oil delivery pump 357 takes the oil in through the oil supply passages 378, 374 and moves the oil through the oil delivery passage 376 as indicated with the arrows 379, 380, 382 of FIG. 5. The pressurized oil is delivered to, for example, the bearings 186, 188, 190 and further to other engine portions. An oil filter assembly 384 (see FIG. 5) preferably is provided for removing alien substances in the oil.

As noted above, the oil that has lubricated the engine portions returns to the oil pan 370 through the oil return passageways 372. The illustrated oil pan 370 preferably has a bulge portion 388 that defines a temporary oil chamber 390 wherein the returned oil temporarily accumulates. With reference to FIG. 6, the bulge portion 388 advantageously is formed at the bottom area of the lower crankcase member 148 so as to be positioned generally at the center thereof along the axis 180 of the crankshaft 178. In other words, the bulge portion 388 is positioned adjacent to the vertical plane 206 along the crankshaft axis 180. An oil strainer 392 depends from the bottom surface of the lower crankcase member 148 into the temporary oil chamber 390 and a portion of the oil passes through the oil strainer 392. The oil strainer 392 removed foreign substances from the returned oil to reduce the amount of foreign particulate matter that passes along the circulation system beyond the strainer 392. It should be noted that the bulge portion 388 preferably is closely sized and configured to accommodate the strainer 392 such that the protrusion of the bulge portion 388 into the clearance area below the engine can be reduced.

The oil return pump 358 is positioned along the oil return passage 396 which connects the temporary oil chamber 390 with the oil reservoir 354. More specifically, the oil return passage 396 preferably is defined between an inlet opening or suction port of the strainer 392 and the return inlet port 356 of the oil reservoir 354. In the illustrated arrangement, an oil cooler 398 is interposed between the oil return pump 358 and the oil reservoir 354 in the oil return passage 396. The oil cooler 398 cools the oil before returning to the oil reservoir 354 because the oil that has lubricated the engine portions accumulates much heat and its viscosity therefore is lowered. The oil cooler 398 restores at least a portion of the lost viscosity and somewhat reconditions the oil. The oil return pump 358 collects the oil in the oil chamber 390 through the oil strainer 392 as indicated by the arrow 399 of FIGS. 5 and 6 and moves it through the oil return passage 396 up to the oil reservoir 354 as indicated by the arrows 400, 402, 404 of FIG. 5. On the way to the reservoir 354, the oil cooler 398 removes the heat accumulated in the oil.

When the engine 54 operates, the crankshaft 178 drives the oil delivery pump 357 and the oil return pump 358 through the gear train. The oil in the oil reservoir 354 pulled into the delivery pump 357 through the external oil supply passage 378 and the inner oil supply passage 374. The oil then is pressurized by the delivery pump 357 and is delivered to the engine portions including the bearings 186, 188, 190 through the oil delivery passages 376. After lubricating the engine portions, the oil drops down to the crankcase chamber 176 and gathers in the oil chamber 390 through the return passageways 372. Then the oil is pumped up by the oil return pump 358 through the oil strainer 392 and returns to the oil reservoir 354 through the oil cooler 398 due to pressurized by the return pump 358.

Preferably, the return pump 358 has a size larger than the delivery pump 357. This is advantageous because the oil in the oil chamber 390 can be more quickly returned to the oil reservoir 354 and the oil does not overflow the chamber 390. The size of the oil pan 370 therefore can be reduced.

With reference to FIG. 6, in the illustrated arrangement the foregoing housing member 320 has a lower portion or second bulge portion 406 projecting downward and its bottom surface is positioned slightly higher than the bottom surface of the bulge portion 388. A space 408 is defined between the lower portion of the housing member 320 and the bulge portion 388 of the oil pan 370.

As noted above, the bulge portion 388 is formed at the bottom area of the lower crankcase member 148 so as to be positioned generally at the center thereof along the axis 180 of the crankshaft 178. This construction is advantageous because all of the oil, which drops downward under gravity, can travel to the oil chamber 176 over generally equal distances from all locations within the crankcase. Accordingly, oil is less likely to pool or stand and most all of the oil returns to the oil chamber 176 over time.

It is anticipated that the lubrication system 352 can employ a wet-sump method instead of the dry-sump method. In this method, the engine 54 needs no oil reservoir but requires an oil pan that is relatively larger one because the oil for circulation is stored in this oil pan. Whether the lubrication system 352 employs the dry-sump method or the wetsump method, a relatively voluminous pan generally is formed under the crankcase chamber 176. As described above, the snowmobile 30 has a linkage assembly 106 that includes the relay rod 126 coupling the combination of the handle post 108 and the pitman arm 128 located to the rear of the engine 54 with the combination of the tie rods 122 and the center arm 124 located forward of the engine 54. The relay rod 126 thus must pass through the engine area and can result in the oil pan 370 being improperly formed.

In the illustrated arrangement, the relay rod 126 and the oil pan 370 are generally horizontally juxtaposed with each other. In other words, the relay rod 126 extends through a region that includes the oil pan 370 at approximately the same vertical height as a portion of the oil pan 370 without extending through the oil pan 370. With reference to FIG. 6, the relay rod 126 preferably is positioned next to the bulge portion 388 which projects downward from the oil pan 370. That is, the relay rod 126 extends in the space 408 that is defined between the lower portion of the housing member 320 and the bulge portion 388 of the oil pan 370. Preferably, a mid portion of the relay rod 126 is generally positioned higher than a bottom surface 410 of the bulge portion 388 and is positioned generally at the same height as the bottom of the housing member 320. A higher position of the relay rod 126 than the housing member 320 is of course possible. In addition, positioning the relay rod below a portion of the housing member 320 but at least level with (or higher than) the lowest portion of the engine, which may or not be the bottom surface 410 of the bulge portion 388 of the oil pan 370.

Because of this arrangement, the relay rod 126 and the oil pan 370 can coexist without interfering with each other. In other words, the relay rod 126 can be spaced apart from the terrain S sufficiently and the engine 54 can be provided with the oil pan 370 that has a sufficient capacity.

The arrangement also has additional advantages. One of these additional advantages is that the bulge portion 388 can offer some degree of protection for the recessed relay rod 126. For instance, in the event that the bottom plate 40 of the snowmobile 30 is deformed toward the relay rod 126 due to a collision with an obstruction in the terrain S, the deformed bottom plate 40 could ultimately contact and harm the rod 126. In general, a rod member can be most easily damaged at its mid portion when external force is exerted thereon. Because the bottom surface 410 of the bulge portion 370 is generally positioned lower than the mid portion of the relay rod 126 in the illustrated arrangement, a deformed plate 40 would not likely contact the mid portion of the rod 126. Thus, even if the plate were bent or otherwise distorted, the relay rod 126 would be substantially shielded from harm.

Moreover, in the illustrated arrangement, as described above, the location of the oil reservoir 354 is generally opposite to the drive pulley 342 of the automatic transmission mechanism 334 relative to the vertical plane 206. This arrangement is useful for substantially equal allotment of the component weight to both sides of the snowmobile 30.

Figure 8:
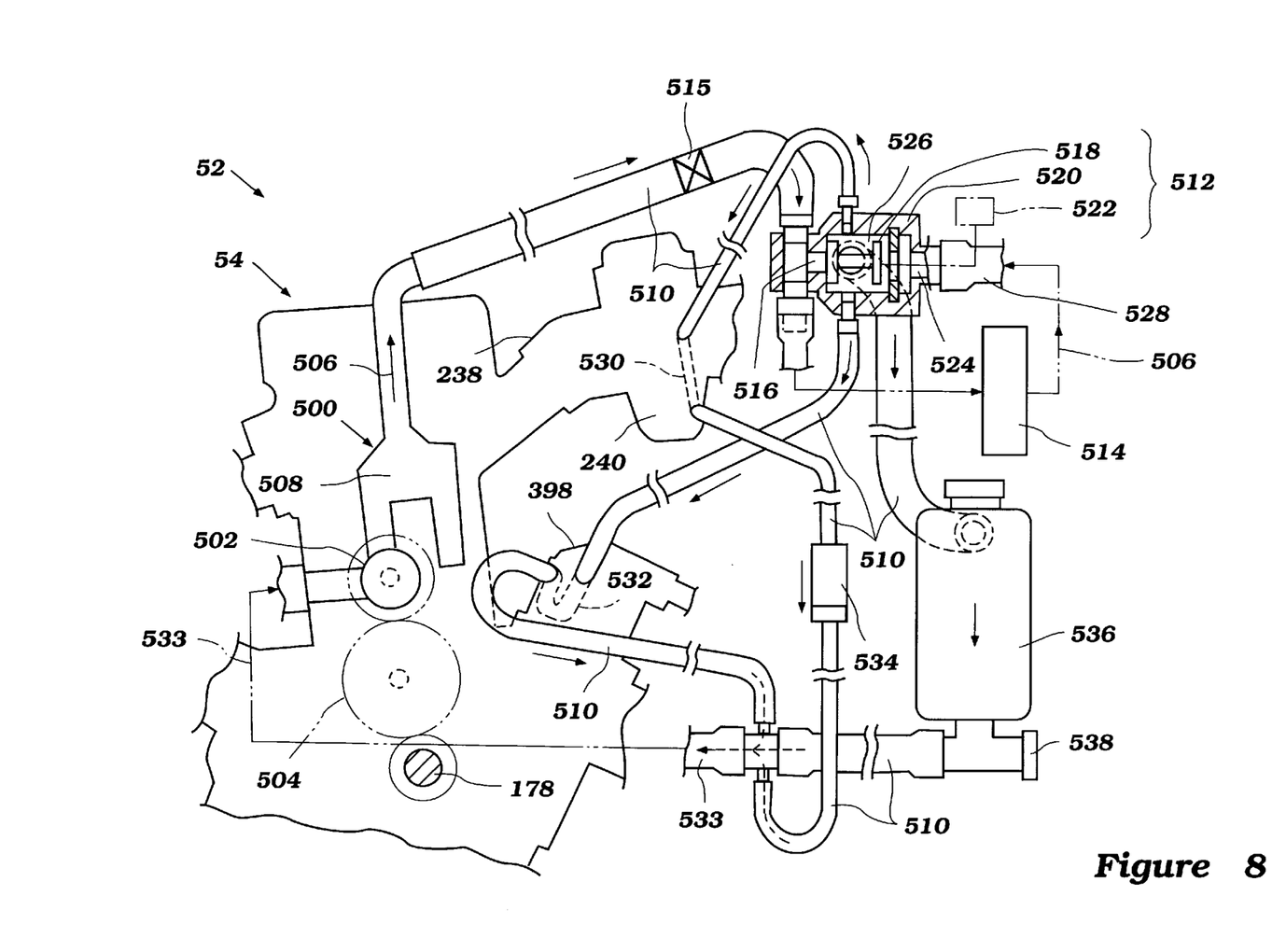
Figure 9:
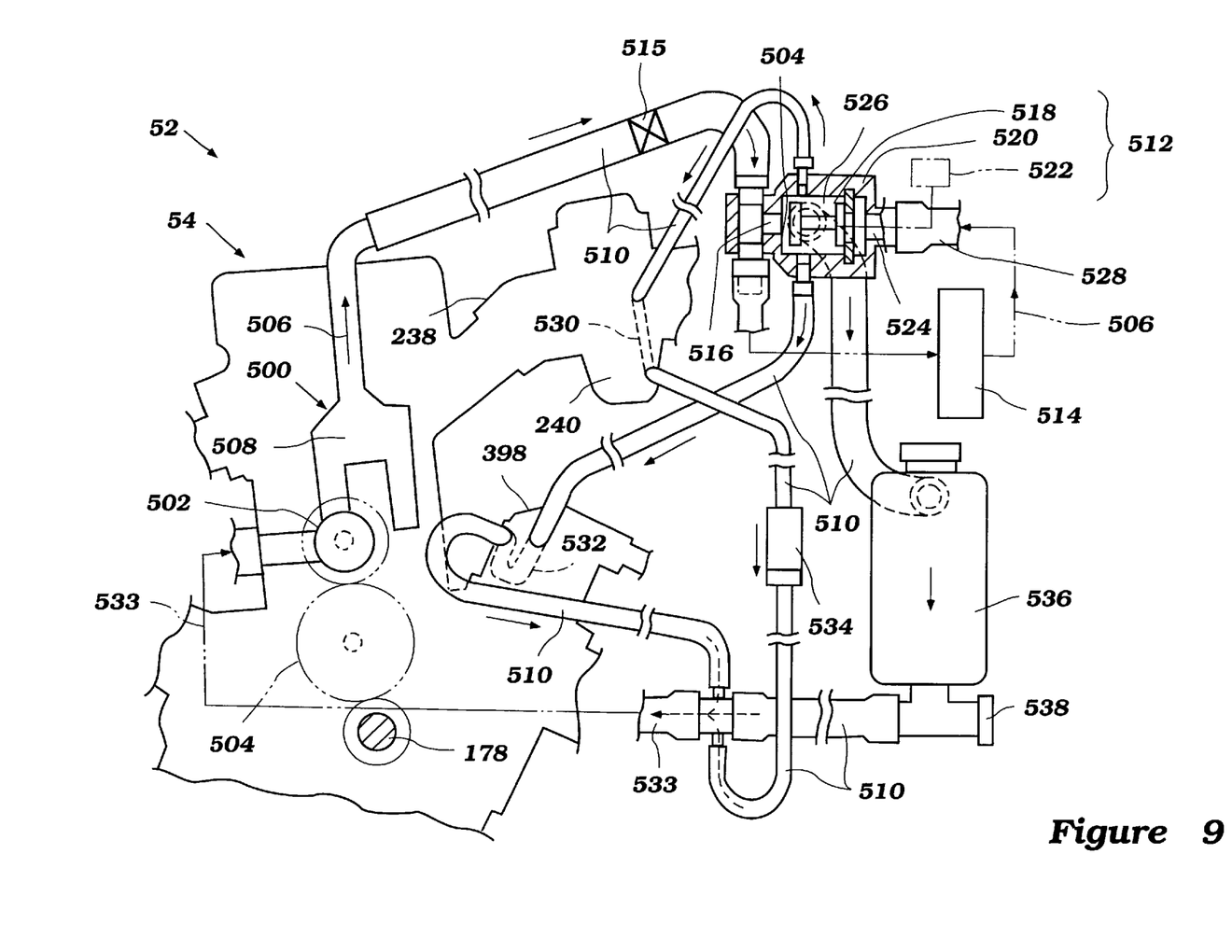

With reference now to FIGS. 8 and 9, a cooling system associated with the engine 54 of the prime mover 52 is illustrated. The cooling system advantageously provides a closed loop cooling circuit 500 that provides coolant to a number of engine components. In the illustrated arrangement, coolant is provided to the carburetor 240 and the oil cooler 398. Of course, other components also can be cooled, such as, for example but without limitation, the cylinder head, the cylinder block, a set of fuel injectors, a fuel rail, a portion of the exhaust system, or the like.

With reference to FIGS. 8 and 9, a water pump 502 is powered through a gear train that includes an intermediate gear 504. The gear train steps down the speed of the crankshaft output to a more manageable speed in the illustrated arrangement. The water pump 502 can be driven by a balancer shaft or another shaft in some arrangements. In addition, a chain or belt drive can be used to power the water pump 502. The water pump 502 preferably comprises an impeller that creates a flow of coolant when the impeller is rotated. Of course, positive displacement pumps or the like also can be used.

The water pump 502 provides a flow of coolant 506 through a set of cooling jackets 508 that are provided in the engine 54. These cooling jackets 508 can be provided in the cylinder block, around the cylinder bores and within the cylinder head. From the cooling jackets 508, the coolant circulates through a water pipe 510 into a switching valve arrangement 512.

The switching valve arrangement 512 routes the coolant to either a heat exchanger 514, such as a radiator, for instance, or a bypass passage 516. As will be appreciated, the snowmobile 30 typically is operated in cold weather. Accordingly, the engine takes longer to warm to a suitable operating temperature. Furthermore, in snowmobiles having a constantly driven coolant pump, such as the water pump 502, the coolant would be circulating within the engine and further slowing the warm-up of the engine. Thus, the bypass passage 516 is provided to help moderate the temperature of the coolant. If the coolant temperature is below a preset temperature, the switching valve arrangement 512 bypasses the heat exchanger 514 through the bypass passage 516 and, if the coolant temperature is above the preset temperature, the switching valve arrangement 512 provides a flow of coolant to the heat exchanger 514. In the illustrated arrangement the coolant either flows through the bypass passage or through the heat exchanger. It is anticipated, however, that the flow rate through the two components can be controlled based on coolant temperature, engine speed, operating time or the like such that some flow through both components can be maintained while moderating the temperature of the coolant. The direction or redirection of coolant flow can be based at least in part on a sensed temperature of the coolant such as that provided by a coolant temperature sensor 515. Any suitable type of coolant temperature sensor can be used.

The illustrated switching valve arrangement comprises a set of valve discs 518 that as translatable within a valve casing 520. In the illustrated arrangement, the valve discs 518 are formed on a piston that reciprocates within the casing 520. An actuator 522 drives the piston between two positions in the illustrated arrangement. Of course, the actuator could be designed to regulate flow by having a number of other positions. Preferably, the actuator 522 comprises a solenoid type actuator. Of course, the actuator can be a stepper motor, a screw drive or any other suitable actuator. In the illustrated arrangement, a set of apertures 524 are formed in the casing that lead to a chamber 526 in which the piston reciprocates. The apertures 524 can be selectively opened or closed by the valve discs 518 and the piston. In particular, when the piston is in a first position, the aperture 524 that is connected to the bypass passage is substantially closed (see FIG. 8) and when the piston is in a second position, the aperture 524 that communicates with a passage 528 that is connected to the heat exchanger 514 is substantially closed (see FIG. 9). In this manner, the coolant either flows through the heat exchanger 514 or flows through the bypass passage 516 into the chamber 526.

From the chamber 526, the coolant is dispersed to engine components that are to be cooled. For instance, a water pipe 510 extends to a cooling jacket 530 that is disposed in the carburetor 240. From the cooling jacket 530 in the carburetor 240, a water pipe 510 extends to a common manifold 533. Flow through the water pipe 510 can be controlled by a thermostat 534 or any other suitable temperature controlled valving assembly. Preferably, the thermostat 534 is positioned along the coolant circuit downstream of at least one cooling jacket such that the temperature of the coolant can be slightly increased by that component. Of course, in the illustrated arrangement, the component is the carburetor which is drawing in atmospheric air at a reduced temperature. This can have a chilling effect on the coolant depending upon the operating conditions. From the manifold 534, the coolant is returned to the pump 502. In some arrangements, the coolant can pass through portions of the crankcase or cylinder block before returning to the pump 502.

Another water line 510 extends to the oil cooler 398 and provides coolant to a water jacket 532 disposed within the oil cooler 398. From the oil cooler 398, a water line 510 delivers the coolant to the manifold 533 and the manifold 533 routes the coolant back to the pump 502 in the illustrated arrangement. A further water line 510 feeds lubricant to a surge tank 536. The surge tank 536 provides a large body reservoir into which expansion of the coolant can be absorbed within the coolant system. The surge tank also can be used to buffer some of the wave disturbances within the system as well as to provide an easily accessed location to check coolant lever and to refill the coolant system as needed or desired. A drain plug 538 can be positioned proximate the water line 510 that extends between a portion of the surge tank 536 and the manifold 533.

Although the present invention has been described in terms of a certain preferred embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A land vehicle comprising an engine, a cooling jacket disposed within a portion of said engine and communicating with a heat exchanger, said heat exchanger being positioned in a location exposed to ambient air, said engine comprising a crankshaft and a peripheral engine component, said peripheral engine component comprising a cooling jacket, a water pump drivingly connected to said crankshaft, a closed loop cooling system comprising a first water delivery conduit providing coolant to a switching valve arrangement, a second water delivery conduit providing coolant to said cooling jacket of said peripheral engine component and a water return line returning coolant to said water pump, said switching valve arrangement comprising a valve, a supply line extending to said heat exchanger and a bypass passage, said switching valve arrangement being adapted to direct coolant through said heat exchanger if a sensed coolant temperature is above a preset temperature and to direct coolant through said bypass passage if said sensed coolant temperature is below said preset temperature, said switching valve arrangement being interposed in the closed loop cooling system between said water pump and said water jacket of said peripheral engine component, wherein said peripheral engine component comprises a carburetor.

2. A land vehicle comprising an engine, a cooling jacket disposed within a portion of said engine and communicating with a heat exchanger, said heat exchanger being positioned in a location exposed to ambient air, said engine comprising a crankshaft and a peripheral engine component, said peripheral engine component comprising a cooling jacket, a water pump drivingly connected to said crankshaft, a closed loop cooling system comprising a first water delivery conduit providing coolant to a switching valve arrangement, a second water delivery conduit providing coolant to said cooling jacket of said peripheral engine component and a water return line returning coolant to said water pump, said switching valve arrangement comprising a valve, a supply line extending to said heat exchanger and a bypass passage, said switching valve arrangement being adapted to direct coolant through said heat exchanger if a sensed coolant temperature is above a preset temperature and to direct coolant through said bypass passage if said sensed coolant temperature is below said preset temperature, wherein said switching valve arrangement communicates with a surge tank.

3. A snowmobile comprising a frame, at least one steerable ski supporting said frame, an engine mounted to said frame and a heat exchanger mounted to said frame, said engine comprising a crankshaft that is rotatably driven and a water pump that is driven by said crankshaft, said engine powering a drive belt, a first cooling jacket disposed within a portion of said engine, a peripheral component mounted to said engine, a second cooling jacket extending through a portion of said peripheral component, a closed loop cooling system comprising said heat exchanger, said first cooling jacket, said second cooling jacket, said water pump and a switching valve arrangement, said switching valve arrangement interposed between said water pump and said heat exchanger, said switching valve arrangement comprising a chamber, a supply line extending to said heat exchanger, a return line extending from said heat exchanger to said chamber and a bypass passage extending into said chamber without extending through said heat exchanger, a valving assembly disposed within said chamber and having a first position to direct a substantial flow through said heat exchanger and a second position to direct a substantial flow around said heat exchanger, an actuator adapted to move said valving assembly to said first position if a sensed coolant temperature is above a preset temperature and adapted to move said valving assembly to said second position if a sensed coolant temperature is below a preset temperature.

4. The snowmobile of claim 3, wherein said valving assembly substantially seals said return line in said second position.

5. The snowmobile of claim 3, wherein said valving assembly substantially seals said bypass passage in said first position.

6. The snowmobile of claim 3 further comprising a thermostat positioned along said closed loop cooling system.

7. The snowmobile of claim 6, wherein said thermostat is disposed between said second cooling jacket and said water pump.

8. The snowmobile of claim 3, wherein said water pump is driven through a gear train that is engaged with said crankshaft.

9. The snowmobile of claim 3 further comprising a surge tank positioned along said closed loop cooling system.

10. The snowmobile of claim 9, wherein said surge tank is in direct fluid communication with said switching valve assembly.

11. A snowmobile comprising an internal combustion engine, a peripheral engine component and a closed circuit cooling system, the internal combustion engine being cooled by the cooling system, a temperature of the peripheral engine component being regulated by the cooling system, the cooling system comprising a water pump configured to pump coolant in a circuit through the cooling system, an engine cooling jacket positioned in the circuit, the engine cooling jacket being configured to transfer heat from the engine, a radiator positioned in the circuit, the radiator being configured to transfer heat from the coolant, a bypass passage positioned in the circuit in parallel with the radiator, a switching valve arrangement positioned in the circuit in series with the radiator and the bypass passage, the switching valve being configured to regulate coolant flow in the circuit between the radiator and the bypass passage and a peripheral engine component water jacket positioned in the circuit downstream from the switching valve and upstream from the engine cooling jacket, the peripheral engine component water jacket being configured to exchange heat between the coolant and the peripheral engine component.

12. The snowmobile of claim 11, wherein the switching valve arrangement is positioned downstream from the radiator and the bypass passage and upstream from the engine cooling jacket.

13. The snowmobile of claim 11, wherein the switching valve arrangement consists substantially of a single switching valve.

14. The snowmobile of claim 11, wherein the switching valve arrangement is configured to switch coolant flow in the circuit between the radiator and the bypass passage.

15. The snowmobile of claim 11, wherein the cooling system further comprises a thermostatically controlled valve positioned in the circuit in series with the peripheral engine component water jacket.

16. The snowmobile of claim 15, wherein the cooling system further comprises a surge tank positioned in the circuit in parallel with the peripheral engine component water jacket.

17. The snowmobile of claim 15, wherein the cooling system further comprises a water line positioned in the circuit in parallel with the peripheral engine component water jacket and the thermostatically controlled valve.

* * * * *